July 31, 1928.
W. E. TRUMPLER
BALANCING MACHINE
Filed May 27, 1926    2 Sheets-Sheet 1
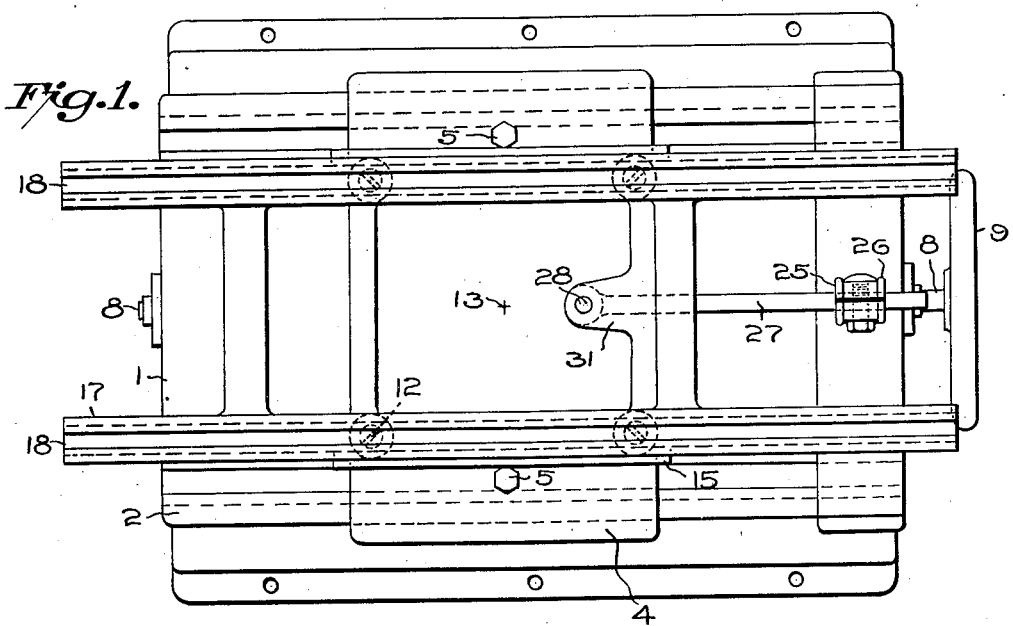
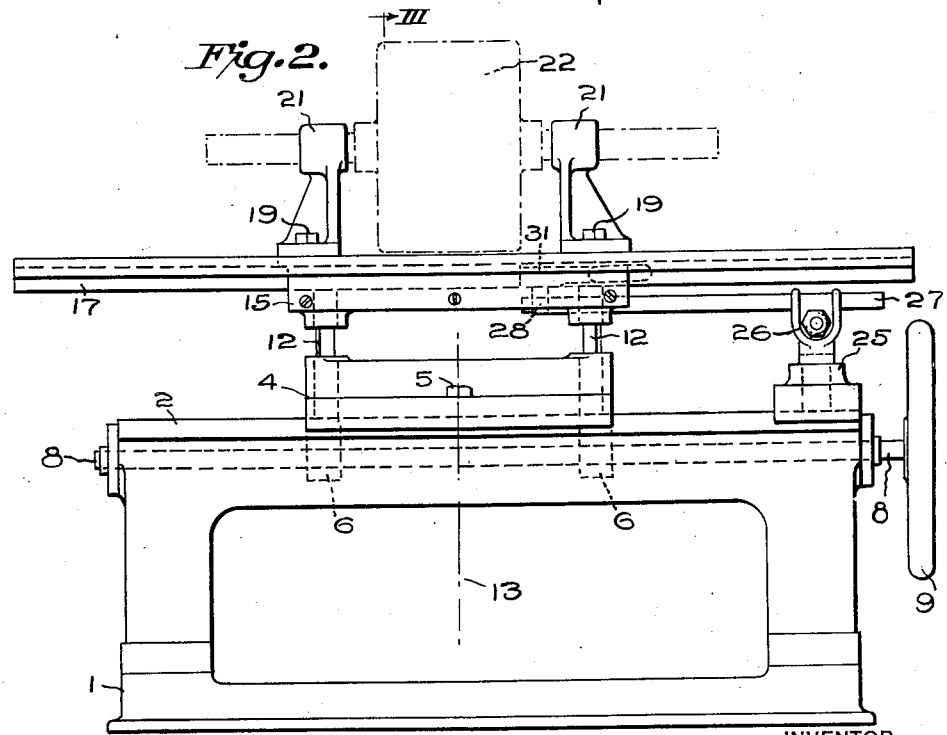

July 31, 1928.

W. E. TRUMPLER 1,678,888

BALANCING MACHINE

Filed May 27, 1926  2 Sheets-Sheet 2

WITNESSES:
R. S. Harrison
W. D. O'Connor

INVENTOR
William E. Trumpler
BY
Wesley G. Carr
ATTORNEY

Patented July 31, 1928.

1,678,888

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed May 27, 1926. Serial No. 111,924.

My invention relates to balancing machines for testing the dynamic unbalance of rotors and the like, and in particular to spring systems therefor.

One of the objects of my invention is to provide a simplified and compact spring system for balancing machines.

Another object of my invention is to provide a spring system for balancing machines that also serves to support the oscillating bed and to provide for pivoting it about a vertical axis.

Another object of my invention is to provide a combined spring system and fulcrum for a balancing machine that will occupy space other than that directly beneath the rotor to be tested, thereby providing convenient access to the rotor for driving it.

A further object of my invention is to provide a spring system for balancing machines that comprises a plurality of leaf springs mounted on edge in such manner that they lie in planes radiating from a common axis.

In my co-pending application, Serial No. 736,458, filed September 8, 1924, I have described a balancing machine having a vertical axis of oscillation and that comprises a combined fulcrum pivot and spring member.

My present invention differs from the device described in my co-pending application in that, instead of utilizing a resilient fulcrum pivot, I provide for oscillation of the bed about a vertical axis by placing a plurality of thin beam springs or leaf springs on edge about the axis and in planes that include the axis of oscillation. In my preferred design, I mount four leaf springs at the four corners of a rectangle in such manner that they lie in planes that are perpendicular to the plane of the rectangle and that include the diagonal lines of the rectangle.

The axis of oscillation is located at the intersection of the diagonal planes which is, of course, at the center of the rectangle and perpendicular to the plane thereof. However, it is not necessary that the axis of oscillation be located at the center of the rectangle or that a rectangular arrangement of the springs be used. Any number of springs may be employed and they may be so placed in any desired pattern that the planes in which they lie intersect on any desired line.

In the accompanying drawings, Fig. 1 is a plan view of a balancing machine having a spring system embodying my invention;

Fig. 2 is a view in side elevation of the balancing machine of Fig. 1;

Figure 3:
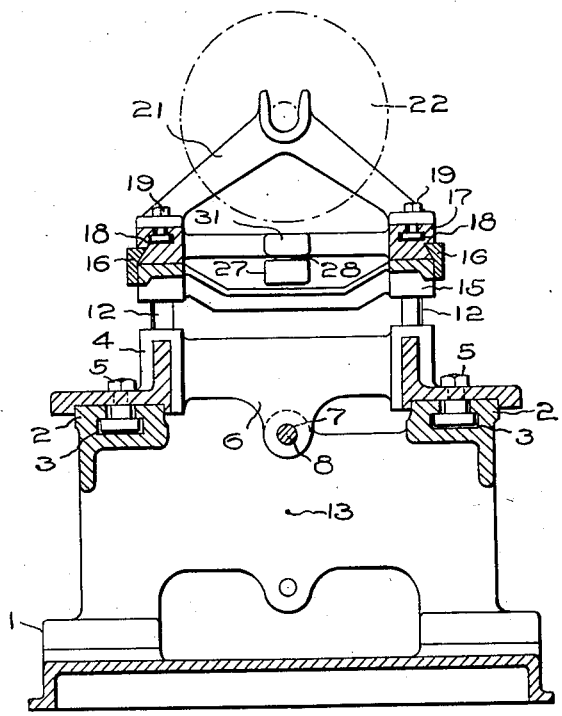
Fig. 3 is a view in cross-section taken on the line III—III of Fig. 2.
Figure 4:
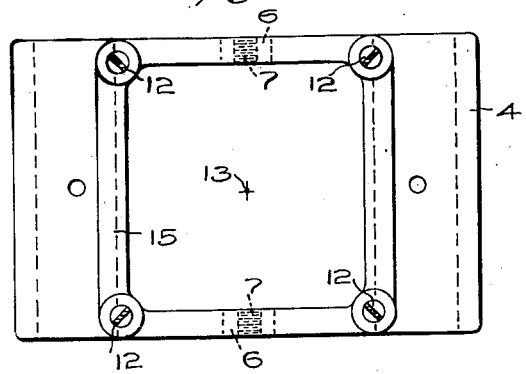
Fig. 4 is a plan view of the spring system embodying my invention.

Referring to the drawings, the balancing machine shown comprises, in general, a base 1 having guide ways 2 and T-slots 3. A spring support 4 is slidably mounted upon the ways 2 and may be secured thereto by means of a plurality of square-head bolts 5 that engage the T-slots 3. The spring support 4 is provided with depending lugs 6 having internal threads 7 for engaging a threaded rod 8 that is mounted longitudinally of the base 1 and is journaled in the ends thereof. The threaded rod 8 is provided with a handwheel 9, by means of which it may be rotated and the position of the spring support 4 upon the ways 2 thereby adjusted.

Flat beam springs or leaf springs 12 are mounted at the corners of the rectangular spring support 4, perpendicular thereto and in planes that pass diagonally through the rectangle outlined by the spring support. The planes in which the springs 12 lie, intersect on an imaginary axis 13 that extends vertically through the center of the spring support 4.

A bed support 15 that is similar in general outline to the spring support 4 is mounted upon the springs 12 in superposed relation to the spring support 4. The bed support 15 is provided with ways 16 for slidably mounting a bed member 17. The bed member 17 is provided with T-slots 18 that are adapted to receive square-head bolts 19 for adjustably securing a pair of bearing pedestals 21 that are adapted to rotatably support a rotor 22 to be tested.

A pedestal 25 is secured to the ways 2 of the bed member 1 and is provided at its upper end with a clamp member 26. A spring arm 27 is adjustably secured by the clamp 26 and is provided at its other end with a torsionally flexible pin 28. A lug 31 is provided on the bed member 17 to constitute a bracket for receiving the pin 28. The purpose of the spring arm 27 is to retain the bed member 17 in fixed longitudinal relation to the base 1.

The operation of this device is briefly as follows:

The rotor 22 to be tested is mounted on the bearing pedestals 21 and caused to rotate by means of a belt or other driving mechanism (not shown). The spring support 4, the springs 12 and the bed support 15 are adjusted as a unit, by means of the handwheel 9, until the axis of oscillation 13 is brought into a transverse plane of the rotor 22 that is convenient for attaching correction weights. Any unbalance in the rotor 22 that is not located in the transverse plane including the axis of oscillation will then manifest itself by causing the bed 17 to oscillate in a horizontal plane about the axis of oscillation 13. This unbalance may then be corrected for, by the usual cut-and-try method, utilizing weights attached to the rotor 22 in some convenient transverse plane other than that occupied by the axis of oscillation.

When the proper correction weights have been attached, the bed member 17 will cease to oscillate. The spring support 4 may then be moved by means of the threaded rod 8 and the handwheel 9 to bring the axis of oscillation into the transverse plane of the rotor 22 in which the correction weights have been attached. The cut-and-try process is repeated, and correction weights attached to the rotor 22 in the transverse plane first occupied by the oscillation axis 13.

It is evident from the above description that a balancing machine made in accordance with my invention provides a simple and compact device which greatly facilitates the operation of balancing a rotor.

Although I have described a specific embodiment of my invention, it will be obvious to those skilled in the art that various modifications may be made in the structural details of the several cooperating parts without departing from the spirit and scope of the invention as set forth in the appended claims.

I claim as my invention:

1. In a balancing machine, the combination with a supporting base, of a plurality of leaf springs mounted perpendicular to said base in planes that intersect at a common axis, and a vibrating bed mounted on the leaf springs.

2. In a machine for balancing rotatable bodies, a base having guide ways thereon, a spring system comprising a spring support, leaf springs and a bed support slidably mounted on the guide ways, a vibrating bed slidably mounted on the bed support, and means for retaining the vibrating bed in fixed longitudinal relation to the base.

3. In a spring system for balancing machines, a rectangular spring support, a similarly shaped bed support in spaced superposed relation thereto, leaf springs disposed on edge between the corners of the spring support and the bed support, said leaf springs having their transverse axes in planes passing through the centers of the spring support and the bed support.

4. In a balancing machine comprising a supporting base and having an axis of oscillation extending vertically through the longitudinal center line thereof, a plurality of leaf springs mounted perpendicular to said base in planes that radiate from the axis of oscillation.

5. The combination with a balancing machine and a supporting base therefor, of a spring system comprising a plurality of leaf springs so mounted on said base that their transverse axes lie in planes having a common line of intersection.

6. In a balancing machine, the combination with a supporting base having guide ways, of a spring support movably mounted on the guide ways, a plurality of leaf springs mounted perpendicular to said spring support and in planes that intersect at a common axis, a bed support mounted on the leaf spring, a vibrating bed movably mounted on the bed support, means for maintaining the bed in fixed longitudinal relation to the base, and means for moving the spring support, leaf springs and bed support as a unit relative to the base and the vibrating bed.

7. A balancing machine comprising a base, a plurality of leaf spring members mounted vertically on the base and an oscillatable bed member mounted on the leaf spring members, said spring members being fixed relative to one another in such manner that their planes intersect at a common center.

8. A balancing machine comprising a base, a plurality of beam spring members mounted on the base and an oscillatable bed member mounted on the spring members, said beam spring members being disposed in such manner that the planes occupied by their neutral axes intersect substantially in a line which is the axis of oscillation of the balancing machine.

9. A balancing machine comprising a base, an oscillatable bed member mounted on the base and a movable fulcrum member interposed between the bed and the base, the fulcrum member comprising a supporting frame and a plurality of leaf springs mounted in the frame in such manner that the planes of their neutral axes intersect substantially in a common line which is the axis of oscillation of the bed member.

In testimony whereof, I have hereunto subscribed my name this 25th day of May, 1926.

WILLIAM E. TRUMPLER.